UNITED STATES PATENT OFFICE.

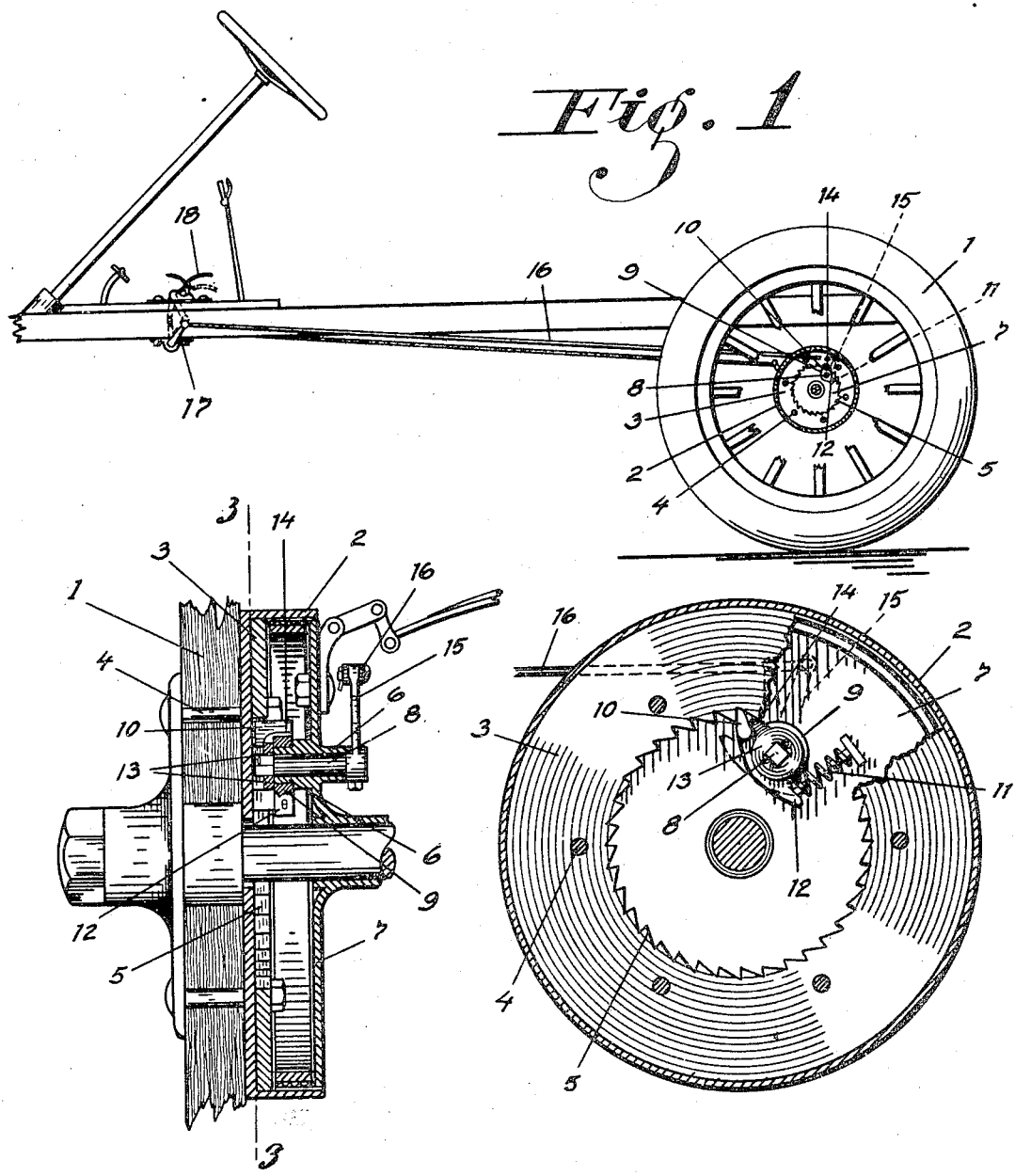

FREDRICK JOAQUIN DE SOTO, OF VALLEY SPRINGS, CALIFORNIA, ASSIGNOR OF ONE-HALF TO CONRAD F. KAISER, OF VALLEY SPRINGS, CALIFORNIA.

AUTOMATIC SAFETY-BRAKE.

1,281,530.  Specification of Letters Patent.  Patented Oct. 15, 1918.

Application filed April 13, 1918. Serial No. 228,389.

*To all whom it may concern:*

Be it known that I, FREDRICK J. DE SOTO, a citizen of the United States, residing at Valley Springs, in the county of Calaveras and State of California, have invented certain new and useful Improvements in Automatic Safety-Brakes; and I do declare the following to be a clear, full, and exact description of the same, reference being had to the accompanying drawings, and to the characters of reference marked thereon, which form a part of this application.

This invention relates to improvements in safety brakes for motor vehicles and particularly that type shown in my Patent No. 1,251,871. The present application relates to improvements upon the structure shown in said patent.

The object of the present invention is to produce such an automatic safety brake as may be applied to the rear wheel of the present day automobile without in any way altering the construction of said wheel.

A further object of the invention is to produce a simple and inexpensive device and yet one which will be exceedingly effective for the purposes for which it is designed.

These objects, I accomplish by means of such structure and relative arrangement of the parts as will fully appear by a perusal of the following specification and claim.

On the drawings, similar characters of reference indicate corresponding parts in the several views.

Figure 1 is a side elevation of the rear wheel of a motor vehicle with the hub and spokes broken away to show how my improved brake apparatus is arranged within the brake drum of the wheel.

Fig. 2 is a vertical section through the brake drum of the wheel showing my improved apparatus.

Fig. 3 is a sectional view taken on a line 3—3 of Fig. 2.

Referring now more particularly to the characters of reference on the drawings, the numeral 1 designates the wheel fastened to which is the usual rigid brake drum 2.

In providing my improved invention, I have an annular washer or ring 3 which is fastened against the inner face of the brake drum 2 by means of bolts 4 which fasten the hub, spokes and brake drum together. The inner periphery of this washer 3 is provided with ratchet teeth 5. A bearing 6 is formed on the inner cover plate 7 of the drum 2 and turnably mounted therein is a small pin 8.

The bearing 6 projects into the drum 2 and turnably mounted on the same within said drum 7 is a cam 9 having an off-set dog or boss 10 on its inner face, which dog is normally held in engagement with the ratchets 5 by means of a spring 11, which presses against a finger member 12 on the opposite side of the cam 9. The inner end of the pin 8 projects beyond the inner end of the bearing 6 and fixed to the same is a washer 13 provided with a finger member 14 which extends over the cam 9 and into the path of travel of the dog 10. On the outer end of the pin 8 is a small arm 15 connected by a cable or rod 16 with a small crank 17 connected with a foot lever 18.

When the vehicle is to be driven up a hill or any other place where it is desired to have a back stop in the event anything goes wrong with the motor or other parts, the lever 18 is operated to move the crank 17 to the position shown in Fig. 1. This, through the medium of the rod 16, pushes on the arm 15 and turns the pin 8 so as to turn the washer 13 and move the finger member 14 away from engagement with the dog 10. Thereupon, the spring 11 pushes the dog into connection with the ratchets 10 and thereafter undirected back movement of the wheel 1 is prevented. When the necessity of the use of the back stop has passed, the lever 18 is operated to pull on the rod 16, which reverses the movement of the parts 15, 8 and 13 and hence moves the finger member 14 against the dog 10 and forces and holds it out of engagement with the ratchets 5.

From the foregoing description it will readily be seen that I have produced such a device as substantially fulfils the objects of the invention as set forth herein.

While this specification sets forth in detail the present and preferred construction of the device, still in practice, such deviations from such detail may be resorted to as do not form a departure from the spirit of the invention as defined by the appended claim.

Having thus described my invention, what I claim as new and useful and desire to secure by Letters Patent is:—

An automatic safety brake comprising the combination with a wheel having a brake drum, of a ring secured against the inner face of the drum and turnable with the wheel, ratchet teeth on the inner face of the ring, a bearing in the outer cover plate of the drum, such drum being stationary, a spring controlled cam turnably mounted on the outside of the bearing and having an offset dog on its inner face adapted to engage the ratchets, a pin mounted turnably in the bearing and passing through and beyond the cam, a washer secured to the inner end of the pin and adjacent to and extending partly over the inner face of the cam whereby the cam is maintained in position on the bearing, a finger on the washer adapted to engage the dog, and a lever actuated arm secured to the pin on the outer end thereof whereby the finger member may be thrown into engagement with the dog to press the same out of engagement with the ratchets.

In testimony whereof I affix my signature in presence of two witnesses.

FREDRICK JOAQUIN DE SOTO.

Witnesses:
VERADINE WARNER,
BERNARD PUVAT.